United States Patent [19]
Ponce

[11] 4,135,809
[45] Jan. 23, 1979

[54] MICROFILM RECORDING AND DEVELOPING APPARATUS

[76] Inventor: Fred H. Ponce, 932 Arroyo Ter., Alhambra, Calif. 91801

[21] Appl. No.: 809,616

[22] Filed: Jun. 24, 1977

[51] Int. Cl.$^2$ .................. G03B 27/32; G03B 27/52
[52] U.S. Cl. ............................ 355/27; 352/158; 354/322; 354/338
[58] Field of Search ................... 355/27-29, 355/64; 352/75, 158; 354/305, 321, 322, 338, 339

[56] References Cited
U.S. PATENT DOCUMENTS

| 3,953,873 | 4/1976 | Tholen et al. | 355/28 X |
| 4,066,354 | 1/1978 | Igarashi et al. | 355/28 |

Primary Examiner—Richard A. Wintercorn
Attorney, Agent, or Firm—Matthew P. Lynch

[57] ABSTRACT

A microfilm recording and developing apparatus comprising an inverted planetary optical system for photographically recording and reducing documents, and the like on microfilm, and a film processor assembly for treating the exposed film. The processor assembly which is of the self-threading type, comprises an elongated, double-walled conveyor which carries a plurality of coupled pairs of upper and lower transporting pinch rollers operated by an associated drive mechanism, and which, following the exposure of the film, causes the exposed film to enter and exit a plurality of chemical pods which respectively contain a developing, fixing, neutralizing and washing liquid. The chemical pods are removably disposed in aperatures formed in the processing conveyor at a location slightly spaced from and beneath each two adjacent pairs of coupled rollers. The chemical pods are of the anti-spillage type and their outer periphery is encapsulated with provision made for only the entrance and exit of the film strip through the chemical pods, the latter being of identical, rectangular-shaped configuration. Passage of the film through the pods is through the top thereof. The interior of the pods are hollow and the inner walls thereof are arcuate and grooved with a slide-way through which the film is caused to pass when introduced into the pods. The slideways are formed into a channel provided with grooved side portions with each of the grooved side portions defining a radius. The interior of the processor in the area surrounding the lower pinched rollers, is recessed such as to define arcuate, peripherally grooved channels through which the film is caused to pass when it is first introduced into the processor and, subsequently, when it is advanced through the respective chemical pods for processing.

42 Claims, 14 Drawing Figures

MICROFILM RECORDING AND DEVELOPING APPARATUS

CROSS REFERENCES TO RELATED APPLICATIONS

None

BACKGROUND OF THE INVENTION

1. Field of the Invention

The present invention relates to a mechanism including an inverted planetary optical system for photographically recording documents, data, and the like on microfilm, and relates more particularly to an improved method and device for advancing and processing the exposed microfilm.

2. Description of the Prior Art

Microfilm developing apparatus of the above type, conventionally, employ an optical system including an objective lens for producing an image or recording of an object on a given frame of the film. Typically, this is accomplished by initially illuminating the object and subsequently directing the resulting optical beam on to the frame of the film to produce an image thereof.

Following exposure of the film, the next step is to properly advance the film for the next cycle of operation. It has, heretofore, been conventional to first expose the film and then to advance the film so that the film is lodged in the proper position for the next succeeding exposure. Known in the art are films with edgewise film positioning perforations and films having no perforations but which are guided by pinch rollers. Those films having positioning perforations are arranged such that the position of the film is determined by the given position of the perforations. When the film is first inserted into the system, the perforations may not be perfectly aligned with the film advancing mechanism so that the first film advance operation may result in a film movement which is less than a full picture frame to be exposed. This is a serious problem when reliance is to be placed upon accurate recording of documents.

In prior art microfilm recording systems, it has been common practice in the development of exposed film to provide a plurality of tanks each containing a different film processing liquid such as a developing liquid, a fixing liquid and a washing liquid. In each tank there usually are provided rollers at the top and bottom thereof and immersed in the film processing liquids. Other rollers have been provided between the tanks. The film or film strip to be processed is guided over these rollers in a generally annular path to form one or more loops in each tank. It has been common practice in the past to drive each of the rollers at the same speed to advance the film evenly through the tanks.

Such an arrangement has the disadvantage that the rotating rollers tend to stretch and mar the surface of the wet film strip, considering that the roller surfaces are in direct physical contact with the major surfaces of the film. A further disadvantage with this type of arrangement is that if there is any speed differential between the rotating rollers, the roller contact with the film surfaces produce not only image distortion but also film breakage due to excess tensioning of the film strip between and against such contacting services.

Still another disadvantage of such prior art apparatus is that the rollers solely determine the path that the film is to take. This becomes extremely objectionable where a thin base film is being employed, and the axis of one or more of the rollers is slightly off-line. The result of such misalignment will be that a thin base film will tend to track to one edge of each misalinged roller where it will bunch up. Additionally, the prior art processing systems require temperature limitations as regards the processing liquids.

SUMMARY OF THE INVENTION

The object of the invention is to avoid the above enumerated disadvantages and to provide an improved microfilm recording and developing apparatus employing a novel film advancing and processing method. A further object of the invention is to provide a novel conveyor system for transporting an exposed non-perforated film through the film processor with minimal contact between the major surfaces of the film and the conveyor means.

A still further objective of the invention is to provide a novel processing arrangement incorporating film conveyor means which prevent image distortion due to excess tensioning of the film during processing thereof.

Yet another object of the invention is to provide a microfilm recording and developing apparatus that is simple and inexpensive enought for home and office use and yet is fully automatic, easy to operate, convenient and compact.

In brief a microfilm recording and developing apparatus embodying the present invention comprises a housing divided into an upper exposure chamber and a lower film processing and developing chamber, the upper chamber including an inverted planetary optical system comprising a platen, a mirror and a deflector arrangement, the latter being adapted to deflect an optical beam from a primary and secondary mirror to a lens and shutter assembly in the camera section in the lower chamber. The shutter is solenoid actuated and retracts, thereby exposing the film advanced from the film reel magazine of the device and which passes over the lens, to the object being microfilmed in the camera section of the apparatus. A sensing device associated with the camera section, permits the film to be moved exactly one frame at a time and determines the maximum number of frames per film or film strip to be exposed. The film is then cut to length by a rotary solenoid cutter assembly at the camera site. In the processing section of the device, the film, after exposure and cutting is caused to enter and exit a plurality of chemical pods which respectively contain a developer, a fixer, a neutralizer, and water. This is accomplished by a drive mechanism associated with the processing section. Subsequently, the film is conveyed through a rotary heated drum for drying. The drive arrangement comprises a plurality of coupled pairs of upper and lower transporting pinch rollers each provided with X-ring members which engage the emulsion and base sides of the film during transport from one chemical pod to the next adjacent one. The film typically, is cut to a predetermined size at the camera section after, for example, 14 frames, upon actuation of a load button advance. The chemical pods are located beneath each two adjacent pairs of rollers. An arcuate, peripherally grooved channel, which forms a film deflecting member surrounds each of the lower rollers such that the film is caused to describe an arch of about 180° around the lower rollers in one direction. The interior of the chemical pods, in turn, are provided with radiused slotted slideways which extend in fluid relationship with the liquid contained in the chemical pods, and which, upon guidance of the film therein by the deflecting channels, causes the film to describe an arch of about 180° in the opposite direction. Both the slideways and the channels are dimensioned so as to accommodate and guide the film without any engagement with the major surfaces thereof.

For a fuller understanding of the nature and object of the invention, reference should be had to the following detailed description taken in connection with the accompanying drawings, wherein;

BRIEF DESCRIPTION OF THE DRAWINGS

FIG. 11 shows a perspective view of an anti-spillage chemical pod and associated reservoir incorporated in the processing section of FIG. 1, illustrating the slideway in the chemical pod and the manner in which the film is guided there through;

DESCRIPTION OF THE PREFERRED EMBODIMENT

Referring now to the drawings in which like reference numerals depect like parts, there is shown a microfilm device according to the invention, indicated generally by the reference numerial 2.

The device 2, in essence, is comprised of a film reel magazine section 4, a camera assembly section 6 disposed after the film reel magazine section 4, a processing assembly 8, a heater section 10, a frame 12 and an optical system referenced generally be 14. The system 14, is an inverted planetary optical system and is mounted to the frame assembly 12. The optical system 14 is comprised of a primary mirror 22 and a secondary mirror for deflector 24, and an intermediate plate 26 which interconnects the mirrors 22 and 24.

Mirror 22 is arranged substantially at a 45° angle with respect to the axis of an objective lens 28 disposed in the lower chamber 20.

The plane of the surface of deflector 24, likewise, extends at an angle of 45° with respect to the axis of lens 28. The intermediate plate 26 extends at an angle of about 10° between mirror 22 and deflector 24. The upper or rear end 30 of mirror 22 is supported by the rear wall 32 of a housing 16.

The exposure system further comprises a generally horizontal, transparent window 34 forming part of the upper wall 36 of housing 16. In operation, a hinged upper plate 38 covers an object 40 illuminated by lamps 41, 42, 43 and 44, FIGS. 1 and 2. The lamps 42, 44 are mounted in recesses 46, 48 formed in plate 26 adjacent to the opposite side walls 50, 52 of housing 16. The recesses 46, 48 are formed with baffle means 54, 56 for illuminating the object 40, positioned for exposure, on the upper surface of window 34, FIG. 1. The lamps 41 and 43 are mounted on the back of mirror 22 on support 57. Part of the upper wall 36 is formed by a removable plate 58, FIG. 1, which enables access to the interior of the upper chamber 18, for replacement of the lamps. The plate 58 is formed with a window 60 which enables an operator to view a counter 62 will be discussed hereinafter.

Typically the assembly of frame 12 is modular and tilts about a hinge 13 for camera and processor access and incorporates a positive quick release and holding system for holding the frame assembly in its closed or open position. The optical assembly 14 mounted to the frame 12 incorporates individual alignment features on the primary and secondary mirrors 22, 24 in order to retain parallel planes throughout the optical reference exis for purposes of eliminating secondary pick up, etc.

Figure 1:
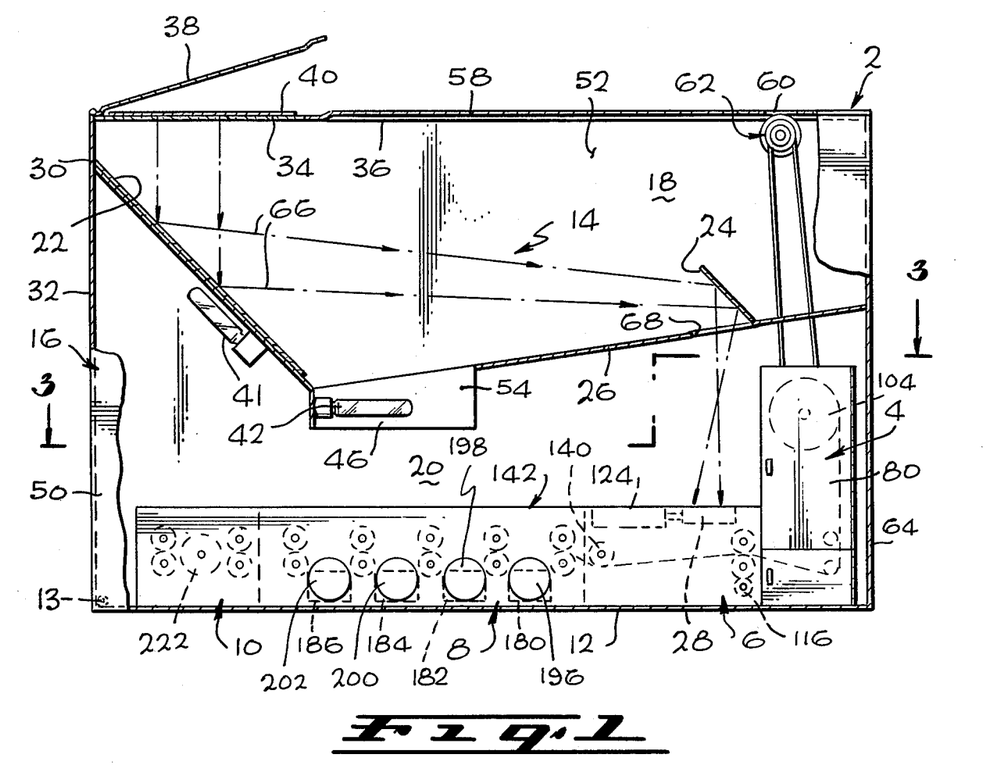
FIG. 1 is a diagramatic side view of the microfilm recording and processing apparatus and optical system embodying the present invention.

As shown in FIG. 1, in illuminating the object 40 on the window 34, optical beams 66 are directed onto mirror 22 and reflected at an angle of about 45° to the surface of deflector 24 which, in turn, deflects the beam at an angle of about 45° through an opening 68 in plate 26 to lens 28. An electrical connection 70 may serve to momentarily light the lamps 41-44 upon, for example, depressing a button 72, FIG. 2.

Figure 2:
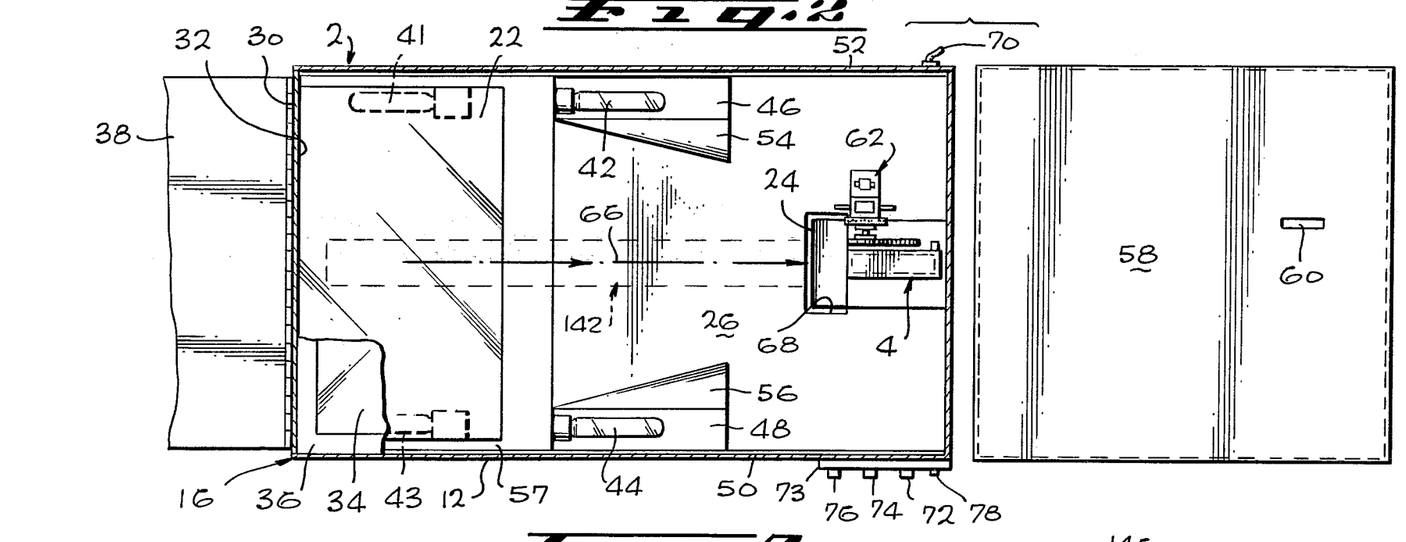
FIG. 2 is a diagramatic top view of the microfilm recording and processing apparatus of FIG. 1, illustrating an upper detachable panel of the apparatus in removed position showing the access door in opening position.

The various controls for the apparatus are mounted upon a control panel 73, FIG. 2, including the button 72 and further comprising a load override button 74 which enables the operator to advance the film without recording any images thereon. The panel 73 is further seen to comprise a potentiometer or light control 76 for darker or lighter film copies and a copy button 78 for frame photograph.

Figures 6, 8:
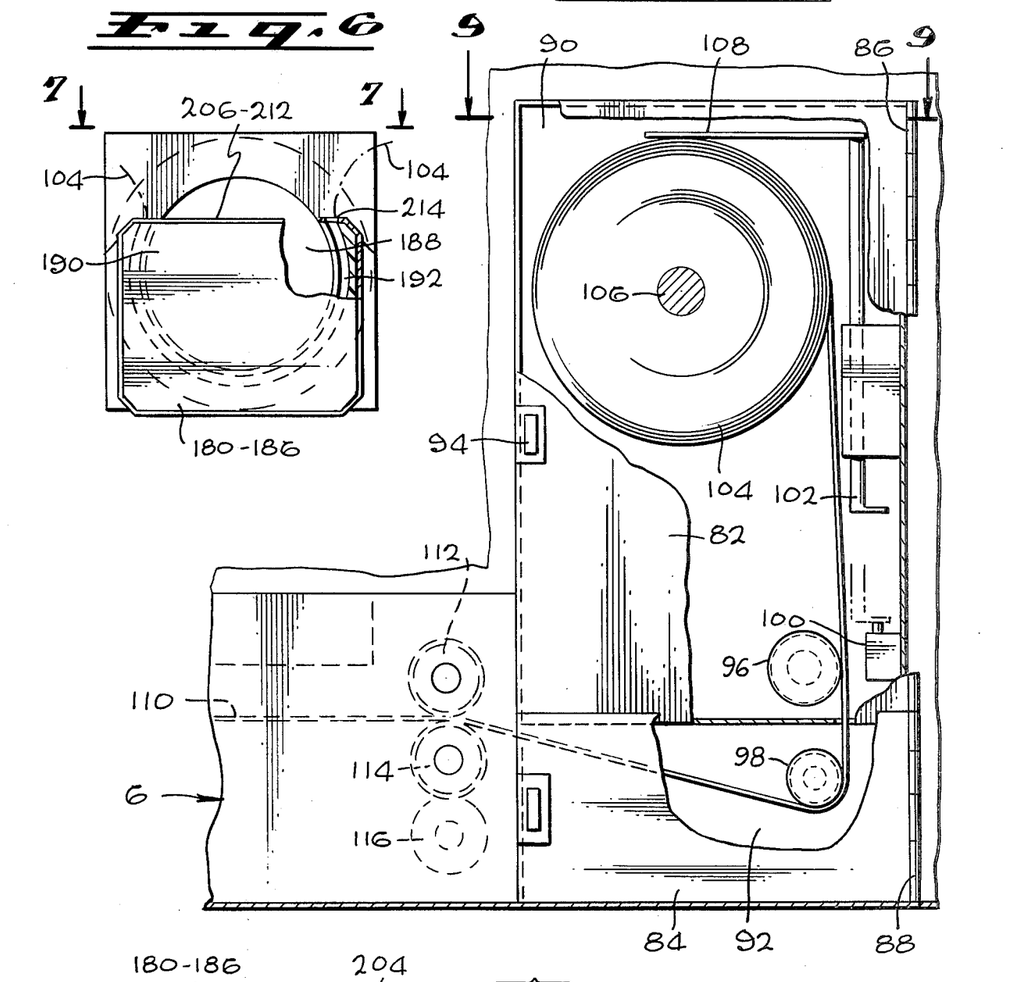
FIG. 6 is a sectional front view of a chemical pod incorporated in the processing assembly of FIG. 5.
FIG. 8 is a plan view of the film reel magazine section according to the invention.
Figure 9:
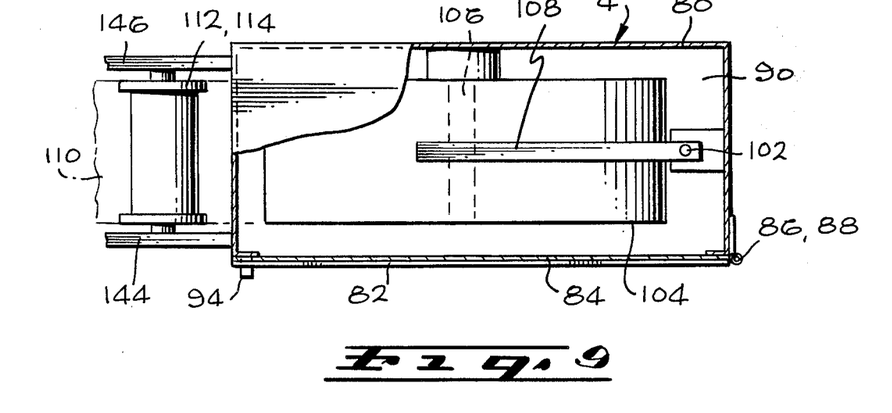
FIG. 9 is a top view of the film reel magazine section taken on line 9—9 of FIG. 8.

The processing assembly 8, camera assembly 6, heater section 10 and film magazine section 4, all are accommodated in the lower chamber 20 of the housing 16, each forming a specific compartment. Discussing initially the film reel magazine section 4, as viewed at the left of FIG. 3 and as further shown in detail in FIG. 9, the assembly 4 is seen to comprise a magazine housing 80 which is permanently mounted to the base of the frame 12. A dual door arrangement 82, 84, is provided on the magazine housing 80 and hingely connected thereto by means of hinged brackets 86, 88. This dual door arrangement is provided to protect the unexposed film housed in the film reel chamber 90 when the film strand is being loaded from the magazine secondary chamber 92 to the camera assembly 6. The dual door arrangement has a positive light tight sealed configuration and integrates a positive and/or secondary seal when the secondary chamber door is open. The doors 82, 84 are provided with quick release and positive latching devices, generally indexed at 94, FIG. 9. Flanged rollers 96, 98 are respectively provided in the film reel chamber 90 and secondary film exit chamber 92 in order to eliminate film stratching, lateral chafing, normal and positive film tracking. Further provided in the chamber is a micro switch 100 which, in essence, is an end of film switch, and which in association with a switch arm 102, indicates the end or at least the last few feet of film 104 positioned on a reel 106. In operation, the switch arm 102 slides down, under gravity, to close the switch 100 indicating the end of the film. As shown in FIG. 8, the switch arm 102, is associated with the film engaging arm 108. It will be seen, that upon unreeling of film 104 from the reel 106 such reduction in film on the reel is sensed by the film engaging arm 108. The lead end of the film, indicated in FIG. 8 by the reference numeral 110, is unreeled from reel 106 and via secondary chamber 24 is inserted into the camera section 6 which contains the lens 28. As shown in FIG. 9, adjacent to the entrance of the lens assembly is a set of pinch rollers 112, 114 with related gear drive 116 (shown in FIG. 3) for film movement after said document has been photographed. Film movement by the film rollers 112, 114 is by a motor driven mechanism 118 and a sensor arrangement 120. The camera assembly 6 is made up of the lens 28, a shutter 122 actuated by a solenoid 124 and a rotary solenoid cutter 126. The camera assembly 6 is modular in design and utilizies all the necessary criteria for light tightness. Typically, the lens assembly has a bottom spring roller aperature 128 for film movement elimination at photographic sequence. The shutter assembly, as shwon, is mounted on top of the camera and the solenoid 124 in this arrangement, is a linear push type DC solenoid and enables image entrance to the lens assembly. The rotary solenoid cutter 126 is mounted to the camera side plate and is located, as shown, at the exit of the lens assembly for strip cutting, as generated by the sensor arrangement 120 of the drive mechanism 118. The drive mechanism 118 with sensor 120 is comprised of a shunt motor provided with attached gear drive.

Each exposure cycle of the system is initiated by the operation of button 78. During the course of each cycle of operation, a circuit is completed to turn on the electric lamps 41 through 44 to provide a uniform high intensity illumination of the object 40. The plate 26 is provided to prevent direct transmission of light to the optical system of lens 28. Upon completion of the circuit, the solenoid 124 is actuated and retracts shutter 122 to photographically record the image of object 40 onto the film which passes before the exposed lens 28. The speed of the shutter 122 is determined by solenoid 124 which, in turn, is determined by the light intensity as controlled by the potentiometer 76 on the control panel.

The film exposure section of camera assembly 6, in addition to containing and operating the shutter 122, is associated with the film advancing mechanism or drive 116 actuated by drive motor 118, which in turn, is energized by the button 72. For the purpose of indexing and classifying the recorded materials, a number may be assigned to each document and photographically recorded on the document, this can be provided by the counter 62 which is included in the optical field of the camera.

It should be noted that when the lamps 41-44 are actuated to illuminate the window area 34, the film is advanced by an amount sufficient to record one frame image on the film.

To limit the number of exposures on a given film strip, the sensor arrangement 120 is disposed adjacent to the counter 62 and is electrically coupled to the motor 118. Such a sensor device 120 has been illustrated in FIGS. 3 and 9. Disposed adjacent the disc shaped sensing device 120 are opto electrical sensors 130, (one shown). The sensing device 120, in this particular arrangement, contains 14 rectangular holes and a cut out 132 intermediate holes 1 and 14 on the sensing device 120. Upon illumination of the disc by light transmitted via a light transmitting system coupled to the lamps 41-44 and for each rectangular hole sensed by one of the sensors 130, the motor 118 is actuated and through the film advancing mechanism 116, the film is advanced by one frame. This is repeated until the sensors 130 "Sense" the cut out 132, whereupon the sensing device 120 activates the solenoid rotary cutter 126, the latter severing the film 104 at a point adjacent to lens 28. Hence the film is allowed to advance through 14 frames and is then automatically sheared. Also, there is the option of exposing less than 14 frames and advancing the remaining blank film which is then sheared. All film strips are cut to the same length, regardless of the number of frames exposed prior to processing.

Figure 5:
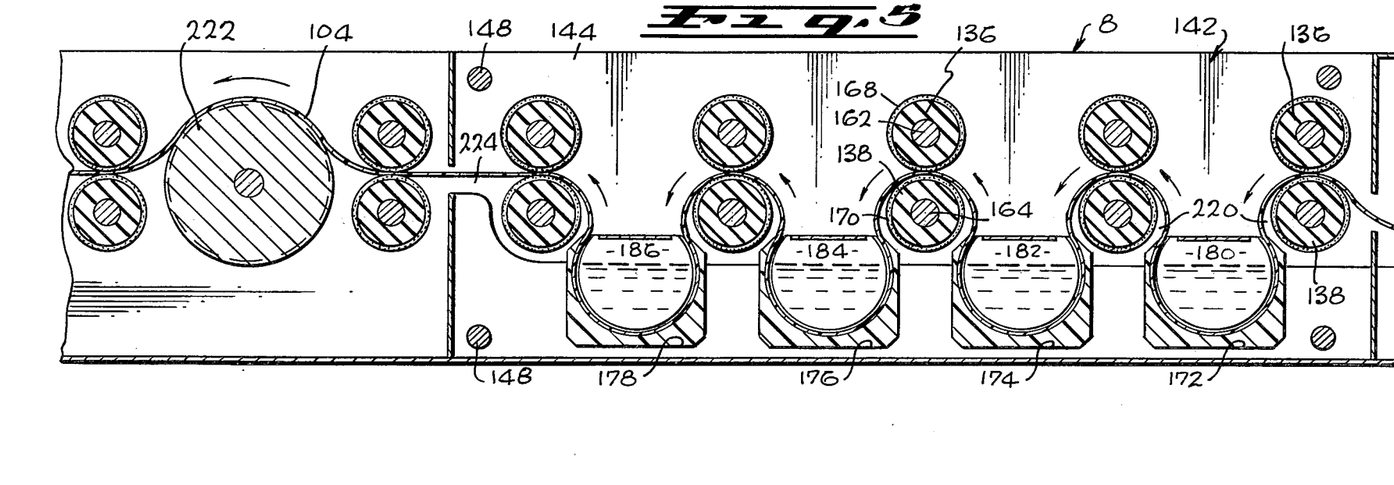
FIG. 5 is a cross sectional view taken on line 5—5 of FIG. 3 illustrating the processing path followed by the film.
Figure 14:
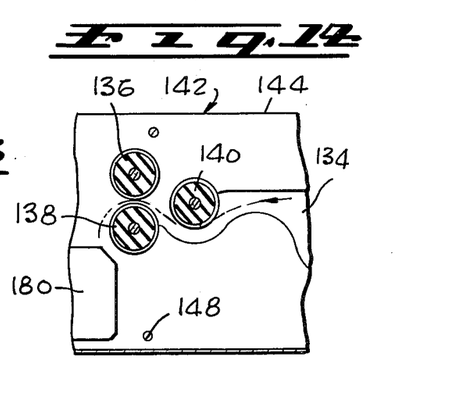
FIG. 14 is a perspective view of an S-drive arrangement incorporated in the advancing system to facilitate guidance of the length of film strip to be processed.

As shown in FIGS. 5 and 14, the film after passing over lens 28, and having an image placed thereon, enters a mechanical film servo 134 for the purpose of ensuring 100% entrance of the film from the camera assembly 6 to the processing assembly 8 after the film is cut. An S-drive has been installed at the exit of the mechanical film servo 134 to guarantee the pick up of the film.

Figure 3:
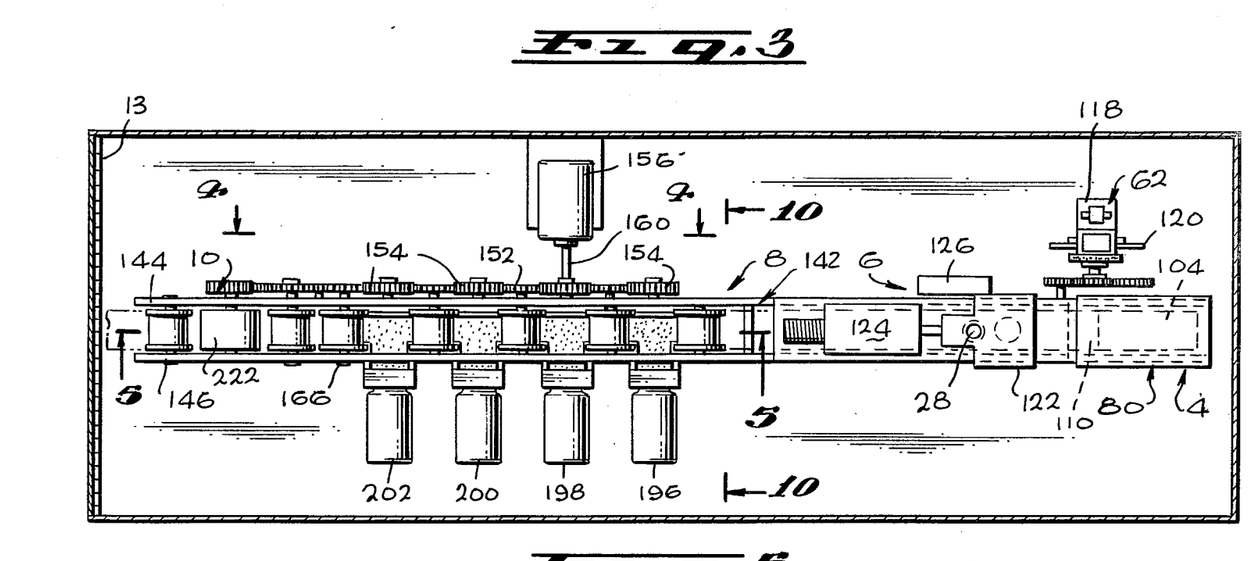
FIG. 3 is a cross sectional view taken on line 3—3 of FIG. 1, illustrating the film processing and dryer arrangement.
Figure 4:
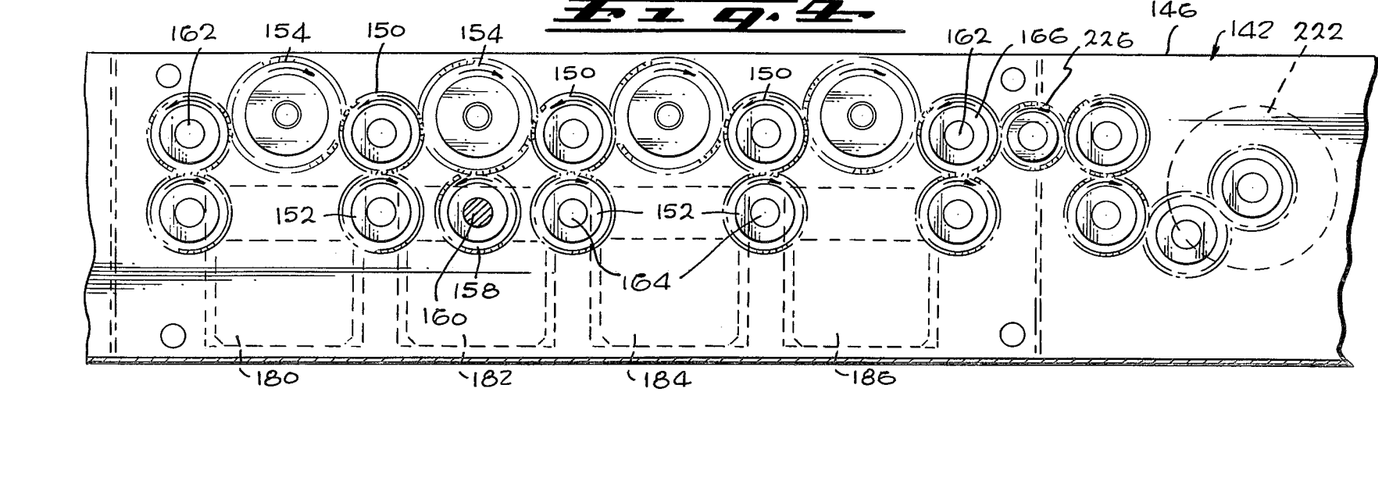
FIG. 4 is a cross sectional view taken on line 4—4 of FIG. 3, illustrating the drive arrangement of the device of FIG. 1.
Figure 10:
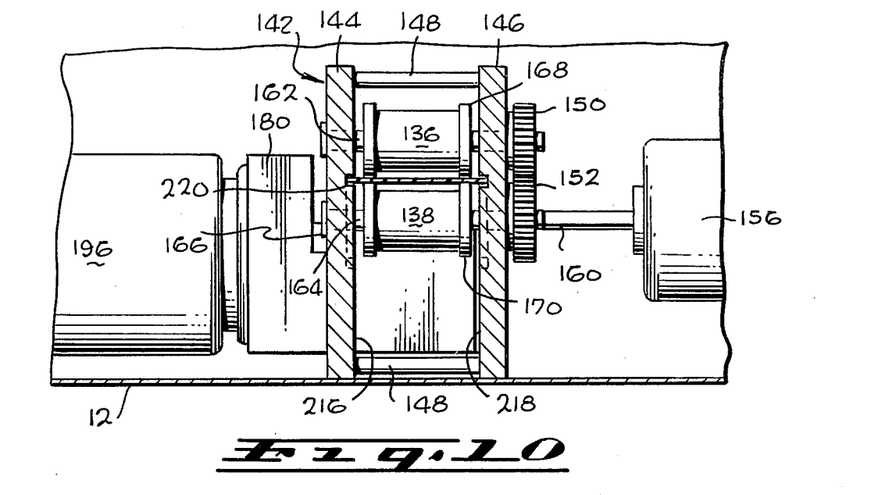
FIG. 10 is a cross sectional view taken on line 10—10 of FIG. 3, illustrating the manner in which the drive arrangement of FIG. 4 is actuated.

The S-drive, as shown in FIG. 14, is seen to comprise a first set of pinch rollers 136, 138 and an idler 140. Following the mechanical servo 134, the film is led beneath the idler 140 and guided between the pinch rollers 136, 138. From the pinch rollers 136, 138, the film is guided through a double walled processing rack, generally referenced at 142. The rack 142 as shown in FIGS. 3 and 4, is seen to comprise two substantially elongated walls, 144, 146, which extend parallel to each other and are interconnected by bridging members 148. Carried by the rack are a plurality of coupled pairs of upper and lower film transporting gears 150 and 152, respectively. The upper gears 150 lie in one plane along the main axis of the rack while the lower gears 152 lie in a second lower plane along the rack main axis. Disposed in a plane slightly above the upper gears 150, are four idler gears 154 which intermesh with each one of the five upper gears 150. As shown in FIGS. 3, 4 and 10, a drive motor 156 drives a main drive gear 158 through a drive shaft 160. The drive gear 158 intermeshes with one of the lower gears 152 and an idler gear 154 and drives these gears. With the drive gear 158 rotating in a counter-clockwise direction each of the upper gears 150 will, likewise, rotate in a counter-clockwise direction on account of the idler gears 154 which rotate in a clockwise direction. Since the upper gears 150 rotate in a counter-clockwise direction and, in effect, drive the lower gears 152, the latter have, as a result, a clockwise rotational direction. Each of the gears 150 is rotated with an associated shaft 162 while each of the lower gears 152 is rotated with an associated shaft 164. The shafts 162 and 164 extend rotatably through he rack 142 and are retained in position relative thereto through the rack 142 and are retained in position relative thereto by means of retaining members 166, FIGS. 3 and 4. The members 166, in turn, are retained in position against the outer surface of rack wall 146. Intermediate rack walls 144, 146, the shafts 162, 164 carry pinch rollers 136, 138, respectively, FIGS. 3, 5 and 10. The pinch rollers 136, 138 rotate with their respective shafts 162, 164 and, assume the same direction of rotation as the gears 150, 152. Surrounding the rollers 136, 138 and disposed adjacent to their outer edges are X-ring members 168, 170 respectively, which extend in rotational abutting engagement with each other, FIGS. 5 and 10.

Figure 7:
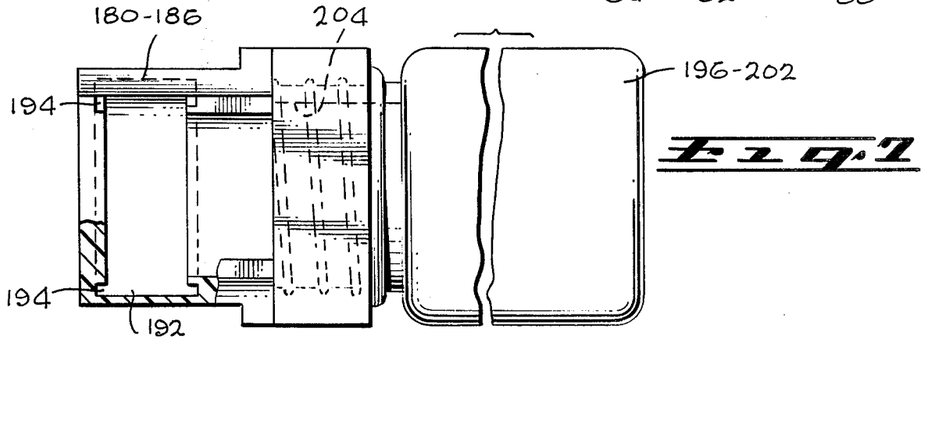
FIG. 7 is a sectional view of the chemical pods taken on line 7—7 of FIG. 6.
Figure 11:
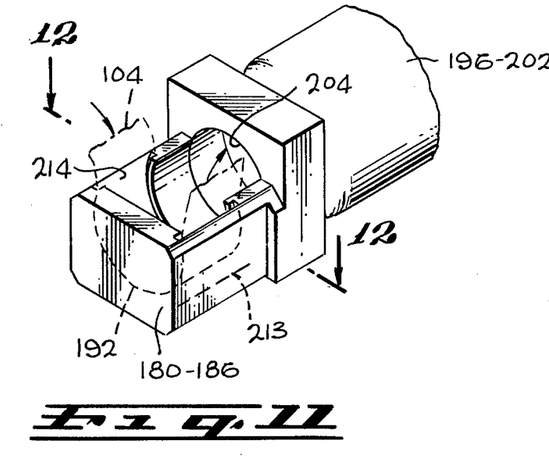
Figure 12:
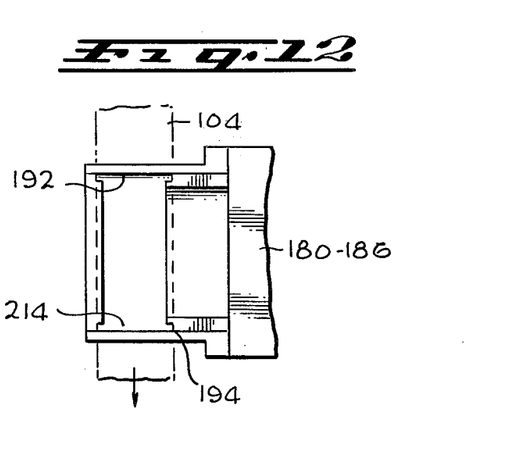
FIG. 12 is a cross sectional view taken on line 12—12 of FIG. 11.
Figure 13:
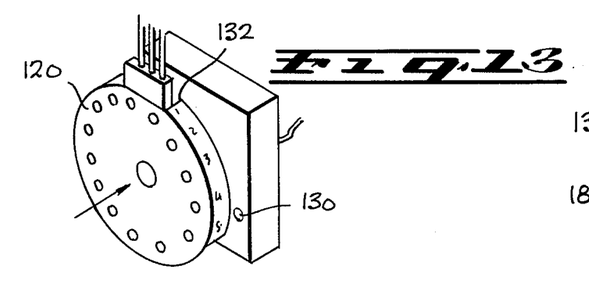
FIG. 13 is a perspective view of the sensor device associated with the camera section of the apparatus.

Disposed in the lower portion of walls 144, 146 are four substantially rectangular-shaped recessed 172, 174, 176 and 178 having identical dimensions, FIGS. 4 and 5 and an equal number of chemical pods and associated reservoirs, 180, 182, 184 and 186, which have a configeration closely conforming to that of the recessed 172–178, are positioned therein. The chemical pods 180–186 are generally trough-shaped and have an opening 188 at the upper and 190, FIGS. 5, 6, 7, 11, 12, and 14. The openings 188 of the pods 180–186 are generally rectangular and oriented upwardly and communicate with the interior of the rack 142. The pods 180–186 are removably positioned in the rack wall at a location intermediate and directly beneath each two adjacent pairs of the coupled pinch rollers 136, 138 FIGS. 4 and 5. The interior of the pods 18–186 is hollow and the inner walls thereof are each provided with an arcuately slotted and grooved slideway 192 through which the film is caused to pass when introduced into the pods 180–186 by the pinch roller 136, 138. As clearly shown, in FIGS. 11 and 12, the slideways 192 are bounded by a pronounced grooved portion 194 provided on both sides of the slideway to retain the film in position. The groove portions 194 are radiused relative to the main axis passing through the center of the grooved portion 194. In this arrangement, the film is enabled to pass through the entire slideway without touching the bottom of the reservoir and further allowing the fluid contained within each of the chemical pods to statically circulate freely both under and over the film permitting the film to be thoroughly treated without touching any surfaces other than its edge surface which engages the grooved portion 194, as shown in detail in FIG. 12. Upon entering the slidway 192, the film is caused to take the arcuate contour of the slideway 192 by the grooved portions 194, FIGS. 6 and 7, and exit into the next adjacent pair of pinched rollers which will direct the film to the next chemical pod. Each of the chemical pods is threadably connected to its associated reservoir 196–198, 200, and 202, as illustrated in FIG. 7. To this end, the reservoirs 196–202 have an inner opening 204, FIG. 7, which is in communication with the interior of the chemical pods 180–186.

The chemical pods 180–186 are of the anti-spillage type and, to this end, the pods are provided with anti-spillage capsules 206, 208, 210 and 212. The capsules fully encapsulate the outer periphery of the pod housing except for a pair of slots 214 in the capsules in the area at the top of the chemical pods. The slots 214 enable the entrance and exit of the film strip as it is advanced through the processor cycle. A drip collector 213 has been installed to retain any chemical spillage at the bottle neck and adjacent areas, FIG. 11.

As particularly shown in FIGS. 5 and 10, the inner surfaces 216–218 of walls 144, 146, respectively, are recessed in the area surrounding the rollers 136. The recessed area 220 have a curvature of about 180° and as shown in FIG. 5, are arranged so that when the film exits from one of the chemical pods 180–186, it is automatically guided to the next pair of pinch rollers and, upon rotation of such pair of rollers the film is automatically deflected downwardly into the next slideway 192 and from there to the next adjacent chemical pod. Upon exiting from the last pod 186, the film is automatically guided to a heater drum 222 in heater section 10 by way of a grooved passageway 224. Additionally, a gear 226 is positioned between the gear 150 and the heater 222 to drive the latter. The heater 222, typically, is a rotating heating drum incorporating two calrod heaters and a thermistor for regulating the heating temperature. Following the drying of the film by the rotating heating drum 222 the film enters an additional set of pinch rollers is provided beyond the heating drum 222 to properly guide the film from the processor section.

While the invention has been described and illustrated with respect to a preferred embodiment, it will be understood by those skilled in the art that various changes and modifications may be made without departing from the spirit and scope of the invention and it is intended therefore in the apended claims to cover all such changes and modifications.

I claim:

1. A microfilm developing device, comprising:
film storage means;
camera means;
means for advancing film from said film storage means to said camera means for exposure of a predetermined length of film by said camera means;
optical means associated with said camera means for optically imprinting and photographically recording an image on said predetermined length of film;
processing means for chemically treating film exposed by said camera means in response to actuation of said optical means, said processing means including a plurality of detachable containers for developing, fixing, neutralizing and washing the exposed film; Transporting and guiding means including arcuate channels in each one of said plurality of detachable containers, and including coupled sets of film engaging pinch rollers adjacent the entrance and exit of each one of said channels in said containers and cooperating with the former, said pinch rollers including film engaging means effective to engage only lateral portions of said film and said rollers being arranged to effect conveyance of exposed film in loop-and self-threading fashion via said channels, consecutively through each one of said containers;
drive means coupled to said pinch rollers for film processing movement of the exposed film to a collection point; and heating means for drying of the chemically treated film.

2. The device of claim 1, further comprising an S-drive for ensuring total film entrance of exposed film from said camera means to said processing means, said S-drive including an S-shaped groove formed structurally in said device intermediate said camera means and said processing means, and interrelated roller members cooperating with said groove and the arcuate channel in the first one of said containers to thereby guide exposed film thereinto in said loop-and self-threading fashion.

3. The device of claim 1, further comprising film shearing means at the exit of said camera means, and sensor means associated with said advancing means adapted to activate said shearing means after exposure of a predetermined number of frames of film.

4. The device of claim 1, wherein said optical means comprises an inverted planetary optical system.

5. The device of claim 4, wherein said inverted planetary optical system comprises primary and secondary mirrors cooperating with said camera means.

6. The device of claim 4, wherein said optical means further comprises object illuminating means.

7. The device of claim 1, wherein said film storage means comprises a film reel magazine including an upper film reel chamber and a secondary film exit chamber for the loading of unexposed film from said magazine to said camera means.

8. The device of claim 1, wherein said camera means comprises a lens assembly and a solenoid actuated shutter assembly normally closing said lens.

9. The device of claim 1, wherein said shutter assembly is mounted on top of said lens assembly and said solenoid is a linear push type DC solenoid, said solenoid upon actuation, effecting image entrance to said lens assembly.

10. The device of claim 1, wherein the film advancing means comprises a set of pinch rollers adjacent the entrance of said camera means and an associate gear drive coupled to said rollers for film movement after the source document is photographed.

11. The device of claim 10, wherein said gear drive is coupled to an A.C. shunt motor.

12. The device of claim 1, wherein said plurality of containers comprises four chemical pod assemblies sandwiched by two side plates of said processing means.

13. The device of claim 12, wherein each of said chemical pods has a hollow interior bounded by a generally arculately-shaped inner wall, and wherein a film guiding and advancing channel is provided in said wall.

14. The device of claim 1, wherein said heating means is a rotary heating drum located directly beyond the last one of said containers.

15. The device of claim 1, wherein said rotating heating drum comprises two calrod heaters and a thermistor for regulating the heating temperature.

16. Improvement in a microfilm developing device, comprising:
 a film exposure device;
 means cooperating with said film exposure device for supplying film thereto to be exposed;
 means optically associated with the film exposure device for photographically recording an imprint onto film supplied thereto;
 means for processing film exposed by said film exposure device, the processing means comprising a series of containers for developing, fixing, neutralizing, and washing the film;
 means associated with said film exposure device for advancing film exposed by said latter device to said processing means;
 means for conveying said exposed film from said film advancing means through said film processing means to a collection point, said conveying means comprising a plurality of coupled pairs of rollers engaging lateral portions of said film, and arcu­lately slotted channels formed in each one of said containers and cooperating with said coupled pairs of rollers to enable said film to be guided in loop- and self-threading fashion through said containers.

17. The structure set forth in claim 16, further comprising heating means for drying said processed film prior to said film being conveyed to said collection point.

18. The structure set forth in claim 17, wherein said film exposure device is a lens and shutter assembly.

19. The structure set forth in claim 17, wherein said containers comprise a base portion having a hollow interior bounded by an arcuately shaped inner wall, and wherein said channels are formed in said walls and include grooved edge portions engaging edge portions of film passing through said channels, said grooved edge portions being radiused and enable positive film tracking.

20. The structure set forth in claim 19, wherein said grooved radiused edge portion closely conform to the contour of the film lateral portions and enable said film to pass through such channels without engagement of its major surfaces with the channel interior other than said grooved edge portions.

21. The structure set forth in claim 16, wherein said plurality of pairs of rollers comprises X-ring members engaging the emulsion and base side of said film.

22. A microfilm developing device, comprising:
 film storage means;
 camera means;
 means for advancing film from said film storage means to said camera means for exposure of a predetermined length of film by said camera means;
 optical means associated with said camera means for optically imprinting and photographically recording an image on said predetermined length of film;
 processing means for mechanically transporting and chemically treating film exposed by said camera means in response to actuation of said optical means, said processing means including a plurality of containers for developing, fixing, neutralizing and washing the exposed film, and including coupled sets of film engating pinch rollers adjacent the entrance and exit of each one of said containers, said pinch rollers being arranged so as to effect conveyance of the exposed film in loop-and self-threading fashion through and from each one of said containers;
 drive means coupled to said pinch rollers for film processing movement of the exposed film to a collection point; and
 heating means for drying the chemically treated film, said film storage means comprising a film reel magazine including an upper film reel chamber and a secondary film exit chamber for the loading of unexposed film from said magazine to said camera means.

23. The device of claim 22, wherein said film reel magazine comprises a dual door arrangement having a positive light-tight configuration adapted to protect from exposure said unexposed film when the latter is being fed from said secondary chamber to said camera means.

24. The device of claim 22, wherein said film reel magazine further comprises flanged roller members in said film reel chamber and said secondary film exit chamber, said roller members adapted to effect normal film position and positive film tracking from said flanged rollers to said camera means.

25. A microfilm developing device, comprising:
 film storage means;
 camera means;

means for advancing film from said film storage means to said camera means for exposure of a predetermined length of film by said camera means;
optical means associated with said camera means for optically imprinting and photographically recording an image on said predetermined length of film;
processing means for mechanically transporting and chemically treating film exposed by said camera means in response to actuation of said optical means, said processing means including a plurality of containers for developing, fixing, neutralizing and washing the exposed film, and including coupled sets of film engaging pinch rollers adjacent the entrance and exit of each one of said containers, said pinch rollers being arranged so as to effect conveyance of the exposed film in loop-and self-threading fashion through and from each one of said containers;
drive means coupled to said pinch rollers for film processing movement of the exposed film to a collection point; and
heating means for drying of the chemically treated film, said shutter assembly being mounted on top of said lens assembly and said solenoid being a linear push-type DC solenoid, the latter, upon actuation, effecting image entrance to said lens assembly.

26. A microfilm developing device, comprising:
film storage means;
camera means;
means for advancing film from said film storage means to said camera means for exposure of a predetermined length of film by said camera means;
optical means associated with said camera means for optically imprinting and photographically recording an image on said predetermined length of film;
processing means for mechanically transporting and chemically treating film exposed by said camera means in response to actuation of said optical means, said processing means including a plurality of containers for developing, fixing, neutralizing and washing the exposed film, and including coupled sets of film engaging pinch rollers adjacent the entrance and exit of each one of said containers, said pinch rollers being arranged so as to effect conveyance of the exposed film in loop-and self-threading fashion through and from each one of said containers;
drive means coupled to said pinch rollers for film processing movement of the exposed film to a collection point; and
heating means for drying of the chemically treated film, said film advancing means comprising a set of pinch rollers adjacent the entrance of said camera means and an associate gear drive coupled to said rollers for film movement after the source document is photographed and said gear drive being coupled to an A.C. shunt motor.

27. The device of claim 26, wherein said gear drive and sensor are associated with sensing means including a disk for frame position and film strip cut.

28. The device of claim 27, wherein said sensing means is a cutter sensor assembly associated with a cutter assembly mounted at the exit of the lens assembly of said camera means for a cut cycle of a predetermined length of exposed film, as generated by said sensor assembly.

29. The device of claim 28, wherein said cutter assembly is a rotary solenoid mounted to the side of said lens assembly.

30. The device of claim 28, wherein said sensor assembly comprises a rotary disk having formed therein a plurality of film frame sensing appatures associated with additional sensor devices which, upon sensing a cut-out in said disk, actuate said cutter assembly.

31. The device of claim 30, wherein said additional sensor devices are electroptical sensing devices.

32. A microfilm developing device, comprising:
film storage means;
camera means;
means for advancing film from said film storage means to said camera means for exposure of a predetermined length of film by said camera means;
optical means associated with said camera means for optically imprinting and photographically recording an image on said predetermined length of film;
processing means for mechanically transporting and chemically treating film exposed by said camera means in response to actuation of said optical means, said processing means including a plurality of containers for developing, fixing, neutralizing and washing the exposed film, and including coupled sets of film engaging pinch rollers adjacent the entrance and exit of each one of said containers, said pinch rollers being arranged so as to effect conveyance of the exposed film in loop-and self-threading fashion through and from each one of said containers;
drive means coupled to said pinch rollers for film processing movement of the exposed film to a collection point; and
heating means for drying of the chemically treated film, said plurality of containers comprising four chemical pod assemblies sandwiched intermediate two side plates of said processing means, each of said chemical pods having a hollow interior bounded by a generally arculately-shaped inner wall and film guiding and advancing channels being provided in said wall cooperating with said coupled sets of film engaging pinch rollers.

33. The device of claim 32, wherein said channels in said pods comprise grooved edge portions engaging the edge portions of film guided there through, each of said groove edged portions defining a radius relative to an imaginary center in said groove edged portions.

34. The device of claim 33, wherein said chemical pods are encapsulated to avoid spillage of chemicals contained therein, the capsules having slots formed therein in those areas corresponding to the entrance and exit of the radiused channels to enable passage of film through said pods.

35. A microfilm developing device, comprising:
film storage means;
camera means;
means for advancing film from said film storage means to said camera means for exposure of a predetermined length of film by said camera means;
optical means associated with said camera means for optically imprinting and photographically recording an image on said predetermined length of film;
processing means for mechanically transporting and chemically treating film exposed by said camera means in response to actuation of said optical means, said processing means including a plurality of containers for developing, fixing, neutralizing and washing the exposed film, and including coupled sets of film engaging pinch rollers adjacent the entrance and exit of each one of said containers, said pinch rollers being arranged so as to effect conveyance of the exposed film in loop-and self-threading fashion through and from each one of said containers;

drive means coupled to said pinch rollers for film processing movement of the exposed film to a collection point; and heating means for drying of the chemically treated film, said heating means being a rotary heating drum located directly beyond the last one of said containers.

36. A microfilm developing device, comprising:
film storage means;
camera means;
means for advancing film from said film storage means to said camera means for exposure of a predetermined length of film by said camera means;
optical means associated with said camera means for optically imprinting and photographically recording an image on said predetermined length of film;
processing means for mechanically transporting and chemically treating film exposed by said camera means in response to actuation of said optical means, said processing means including a plurality of containers for developing, fixing, neutralizing and washing the exposed film, and including coupled sets of film engaging pinch rollers adjacent the entrance and exit of each one of said containers, said pinch rollers being arranged so as to effect conveyance of the exposed film in loop-and self-threading fashion through and from each one of said containers;

drive means coupled to said pinch rollers for film processing movement of the exposed film to a collection point; and heating means for drying of the chemically treated film, said rotating heating drum comprising two calrod heaters and a thermistor for regulating the heating temperature.

37. Improvement in a microfilm developing device, comprising:
a film exposure device;
means cooperating with said film exposure device for supplying film thereto to be exposed;
means optically associated with the film exposure device for photographically recording an imprint onto film supplied thereto;
means for advancing film exposed by said film exposure device;
means for processing film exposed by said film exposure device, the processing means comprising a series of containers for developing, fixing, neutralizing, and washing the film;
means for conveying said exposed film from said film advancing means through said film processing means to a collection point, said conveying means comprising a plurality of coupled pairs of rollers engaging lateral portions of said film, and arcuately slotted channels associated with each of said containers to enable said film to be guided in loop-and self-threading fashion through said containers; and heating means for drying said processed film prior to said film being conveyed to said collection point, said containers comprising a base portion including a hollow interior bounded by an arcuately shaped inner wall and channels formed in the container inner walls, the latter including grooved edge portions engaging cooperating edge portions of film passing through said channels, said grooved edge portions being radiused and enabling positive film tracking, the edge portions closely conforming to the contour of the film lateral portions and enabling said film to pass through said channels without engagement of its major surfaces with the channels interior other than said grooved edge portions.

38. Improvement in a microfilm developing device, comprising:
a film exposure device;
means cooperating with said film exposure device for supplying film thereto to be exposed;
means optically associated with the film exposure device for photographically recording an inprint onto film supplied thereto;
means for advancing film exposed by said film exposure device;
means for processing film exposed by said film exposure device, the processing means comprising a series of containers for developing, fixing, neutralizing, and washing the film;
means for conveying said exposed film from said film advancing means through said film processing means to a collection point, said conveying means comprising a plurality of coupled pairs of rollers engaging lateral portions of said film, and arcuately slotted channels associated with each of said containers to enable said film to be guided in loop-and self-threading fashion through said containers; and said plurality of coupled pairs of rollers comprising X-ring members engaging the emulsion and base side of said film.

39. The structure set forth in claim 37, wherein the film conveying means further comprises film transporting rollers between the film washing container and said heating means, and film channel means between said heating means and said collection point.

40. The structure set forth in claim 37, wherein said film exposure device is a lens and shutter assembly.

41. The structure set forth in claim 37, wherein said conveying means for said film further comprises gear drive means for driving said plurality of coupled pairs of rollers via a single main drive gear interacting with said plurality of coupled pairs of film rollers.

42. The structure set forth in claim 37, wherein said film advancing means comprises a pair of coupled, motor-driven film pinch rollers adjacent the entrance of said film exposure device for advancing film exposed therein to said film conveying means.

* * * * *